(12) United States Patent
Chai et al.

(10) Patent No.: US 6,904,923 B2
(45) Date of Patent: *Jun. 14, 2005

(54) SUNSHADE

(75) Inventors: Lun Chai, New Territories (HK); Tsang To Chai, New Territories (HK)

(73) Assignee: Quantum Auto (Hong Kong) Limited, Hong Kong (HK)

(*) Notice: Subject to any disclaimer, the term of this patent is extended or adjusted under 35 U.S.C. 154(b) by 0 days.

This patent is subject to a terminal disclaimer.

(21) Appl. No.: 10/072,367

(22) Filed: Feb. 7, 2002

(65) Prior Publication Data

US 2002/0092553 A1 Jul. 18, 2002

Related U.S. Application Data

(60) Division of application No. 09/375,981, filed on Aug. 16, 1999, now Pat. No. 6,357,461, which is a continuation-in-part of application No. 09/119,830, filed on Jul. 21, 1998, now Pat. No. 6,116,256.

(51) Int. Cl.[7] .............................................. E04H 15/06
(52) U.S. Cl. ..................... 135/88.09; 135/21; 135/25.1; 135/30; 135/31; 160/370.21; 296/97.7; 296/97.8
(58) Field of Search ......................... 135/21, 25.1, 30, 135/31, 88.09, 90, 140, 142, 155, 117; 180/370.21; 296/97.7, 97.8

(56) References Cited

U.S. PATENT DOCUMENTS

| | | | |
|---|---|---|---|
| 757,175 A | * | 4/1904 | Burland ..................... 135/90 |
| 2,723,673 A | * | 11/1955 | Call ........................... 135/140 |
| 2,736,375 A | | 2/1956 | Rupert |
| 3,867,019 A | * | 2/1975 | Eyerman ................... 396/4 |
| 4,349,040 A | | 9/1982 | Miller |
| 4,363,513 A | | 12/1982 | Sahar |
| 4,433,699 A | | 2/1984 | Schultes et al. |
| 4,632,138 A | | 12/1986 | Irwin |
| 4,711,260 A | | 12/1987 | Wiens et al. |
| 4,877,074 A | | 10/1989 | Castellano |
| 4,962,780 A | | 10/1990 | Engdahl et al. |
| 5,002,083 A | * | 3/1991 | Kim ........................... 135/98 |
| 5,038,812 A | | 8/1991 | Norman |
| 5,116,273 A | | 5/1992 | Chan |
| 5,213,123 A | | 5/1993 | Whitfield |
| 5,213,147 A | | 5/1993 | Zheng |
| 5,284,198 A | | 2/1994 | Kauka |
| 5,445,428 A | | 8/1995 | Yung-Sung |
| 5,551,464 A | | 9/1996 | Kelly |
| 5,601,103 A | | 2/1997 | Dubinunsky |
| 5,645,119 A | | 7/1997 | Caruso |
| 5,694,998 A | | 12/1997 | Chen |
| 5,816,310 A | | 10/1998 | Wu |
| 5,868,152 A | | 2/1999 | Brown |
| 6,032,718 A | | 3/2000 | Chen |
| 6,095,230 A | | 8/2000 | Mitchell et al. |
| 6,116,256 A | | 9/2000 | Pawsey et al. |
| 6,135,191 A | | 10/2000 | Mitchell et al. |

FOREIGN PATENT DOCUMENTS

| | | |
|---|---|---|
| DE | 3113994 | 10/1982 |
| DE | 4121623 | 11/1992 |
| GB | 1590626 | 6/1981 |

* cited by examiner

*Primary Examiner*—Brian E. Glessner
*Assistant Examiner*—Yvonne M. Horton
(74) *Attorney, Agent, or Firm*—Raymond Sun

(57) ABSTRACT

A sunshade has a shade and at least two supports, with each support having a second end that is coupled to the shade at spaced-apart locations thereof. The sunshade also has a connector coupled to the first end of each support, the connector having a central portion that has a groove, and a leaf for coupling the first end of each support. The leaf is hingedly connected to the central portion by an integral thin section and has a locking member fitted inside the groove to hold the leaf at a fixed position with respect to the central portion. Each support of the sunshade can also have an adjustable length.

12 Claims, 16 Drawing Sheets

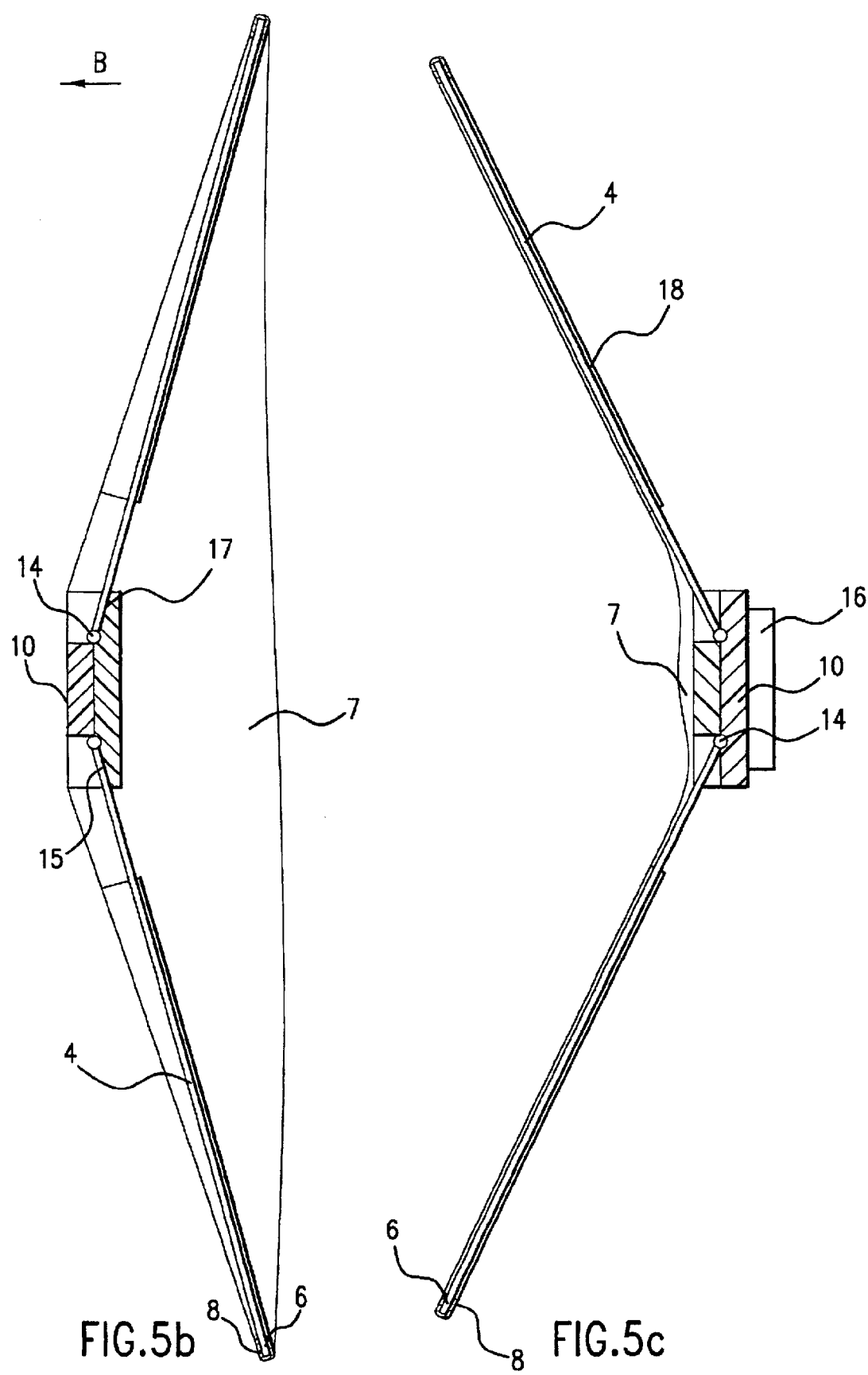

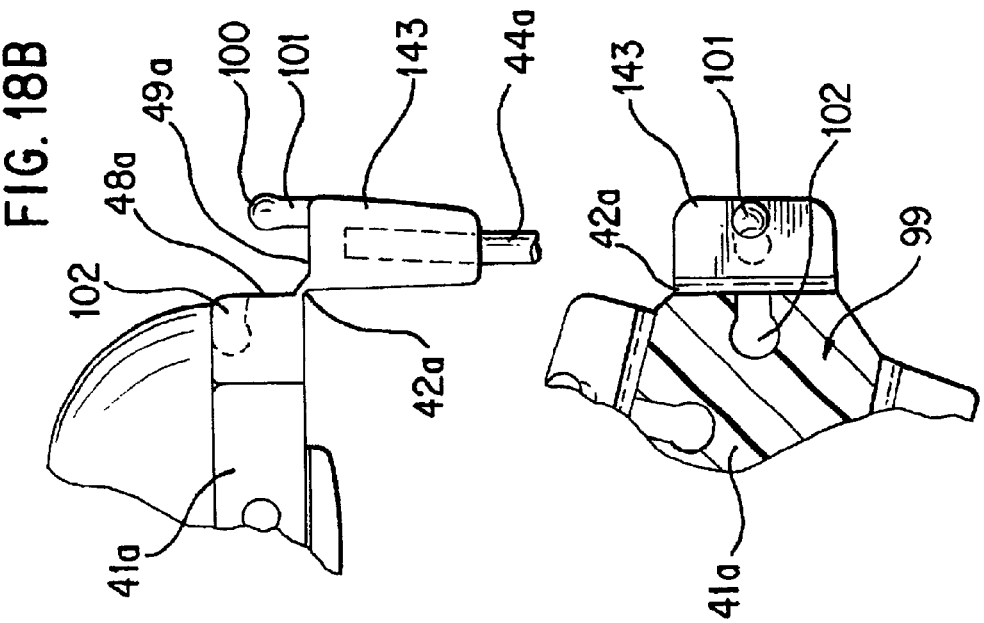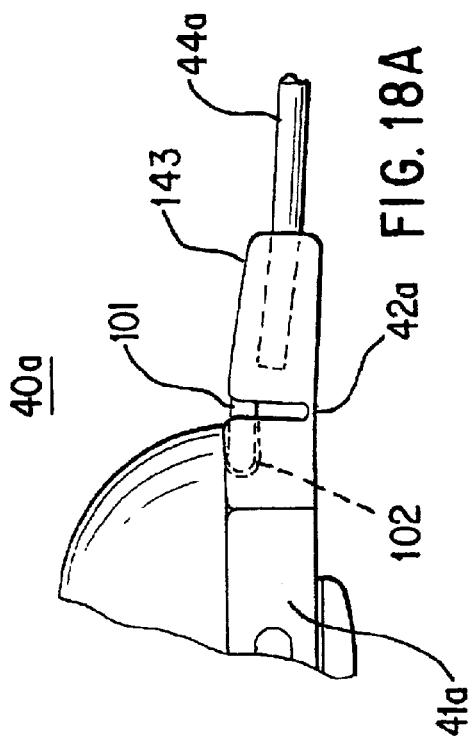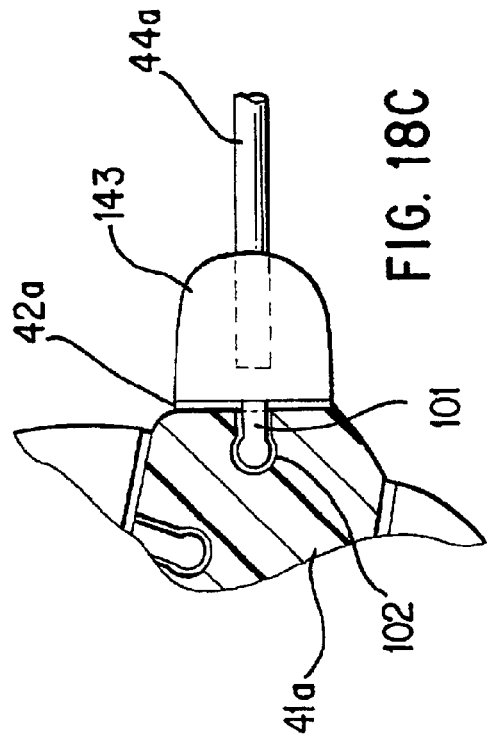

SUNSHADE

RELATED CASES

This is a divisional of Ser. No. 09/375,981, filed Aug. 16, 1999, now U.S. Pat. No. 6,357,461, which is a continuation-in-part of Ser. No. 09/119,830, entitled "Sunshade", filed Jul. 21, 1998, now U.S. Pat. No. 6,116,256, whose disclosure is incorporated by this reference as though fully set forth herein.

BACKGROUND OF THE INVENTION

1. Field of the Invention

The present invention relates to sunshades that can be used for shading the interior of a vehicle from the heat of sunlight.

2. Description of the Prior Art

Vehicles, particularly cars, are commonly left unattended in places exposed to sunshine. For security, the windows of such a vehicle are usually closed and there is little airflow through the vehicles. Accordingly, the interior of the vehicle often warms up as a result of the sun shining on the vehicle. The temperature inside the vehicle may rise significantly above the ambient temperature to a temperature that is particularly uncomfortable when a person desires to enter the car. A further problem caused is that the significant heat generated may damage objects contained within the car or internal parts of the car which are sensitive to heat. Also, parts of the car which must be touched by the driver in order to properly drive the car may be heated to a temperature that is uncomfortable to touch by bare hands. This may lead to dangerous driving practices.

The problem of the temperature inside a car rising has existed for some time and is particularly acute in those places where there is greater exposure to sunshine. To some extent, this problem is also seasonal, being greater in summer. While one solution is to allow significant airflow through the vehicle (by, for example, opening all of the doors) and allowing the transfer of air to reduce the heat inside the vehicle before entering the vehicle, this may take some time which is often unacceptable to the driver, or other intended occupants, of the vehicle.

It is known to provide a substantially opaque material across the surface of the windscreen of a vehicle (whether inside or outside) so as to shade the interior of the vehicle. This has been found to reduce the rate at which the temperature inside the vehicle increases as well as to reduce the temperature of controls necessary to properly operate the vehicle. In addition, reflective coatings have been applied to such materials to better reflect heat and light from external sources, such as the sun.

It is also known to provide such sunshades in a relatively closely woven netting form so as to provide shade without completely blocking out all light. This is particularly appropriate for side windows where the shades may be left in place while the vehicle is being driven and permit some transparency for occupants of the vehicle to see through them.

A difficulty with all of these methods has been a complicated or time-consuming method for affixing the sunshades in place. It is known to use suction cups to affix the sunshade to a window and also to suspend or attach the sunshade to interior fittings of a vehicle, such as grab handles and rear view mirrors. Other sunshades are known which are of sufficient rigidity that they retain (without external support) an expanded configuration and can be located between, for example, a rear view mirror and the windscreen, with a lower edge supported by the vehicle dashboard, but these must be carefully folded after each use. Other sunshades are affixed by being placed, for example, along the inside of a front side window, through the door hinge and across the outside of the windscreen and then through the opposite front door hinge along the inside of the opposite front door and thereby being jammed into position. A combination of these methods of attachment may be used. However, all of these methods require some effort and time in order to affix the sunshade, particularly where connection means, such as straps, clips and suction cups, must be affixed. Time and effort is also required in known products to store or stow the sunshade in the vehicle in a safe and tidy manner. It has been found that vehicle drivers prefer to minimize the time required in order to affix such a sunshade.

Another common problem associated with conventional sunshades is that windshields for different automobiles have different sizes. Most conventional sunshades come in a predetermined shape and size, so they often do not provide a proper fit for the windshield that they are being used with.

Thus, there remains a need for a vehicle sunshade which is relatively quick and easy to install, and to collapse or fold into a shape or configuration which may be stored safely and compactly in a vehicle. There also remains a need for a vehicle sunshade whose size can be varied to fit windshields of different sizes.

SUMMARY OF THE DISCLOSURE

The objectives of the present invention can be accomplished by providing a sunshade that has a shade and at least two supports, with each support having a second end that is coupled to the shade at spaced-apart locations thereof. The sunshade also has a connector coupled to the first end of each support, the connector having a central portion that has a groove, and a leaf for coupling the first end of each support. The leaf is hingedly connected to the central portion by an integral thin section and has a locking member fitted inside the groove to hold the leaf at a fixed position with respect to the central portion.

The present invention also provides a sunshade that has a shade and at least two supports, with one end of each support coupled to the shade at spaced-apart locations thereof, and each support having an adjustable length.

BRIEF DESCRIPTION OF THE DRAWINGS

FIGS. 5*a*, 5*b* and 5*c* are cross-sectional views of the connectors and the supports for the sunshade of FIG. 1 shown in the collapsed condition, fully expanded condition, and partly expanded condition, respectively.

FIGS. 18A and 18B are side views illustrating a modification that can be made to the connector of FIGS. 10a and 10b.

FIGS. 18C and 18D are top views of the connector of FIGS. 18A and 18B, respectively.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 2:
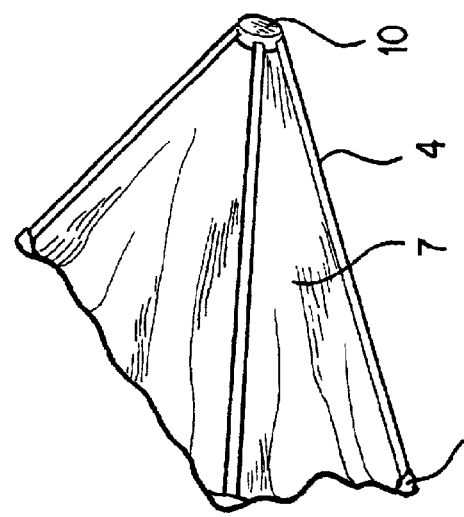
FIG. 2 is a perspective view of a portion of the sunshade of FIG. 1 shown in a partly collapsed condition.
Figure 3:
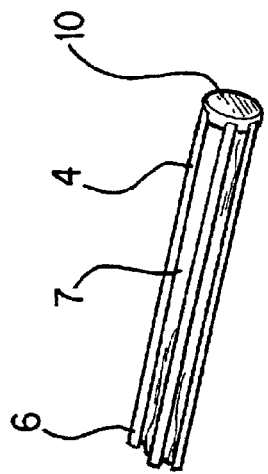
FIG. 3 is a perspective view of a portion of the sunshade of FIG. 1 shown in a fully collapsed condition.
Figure 1:
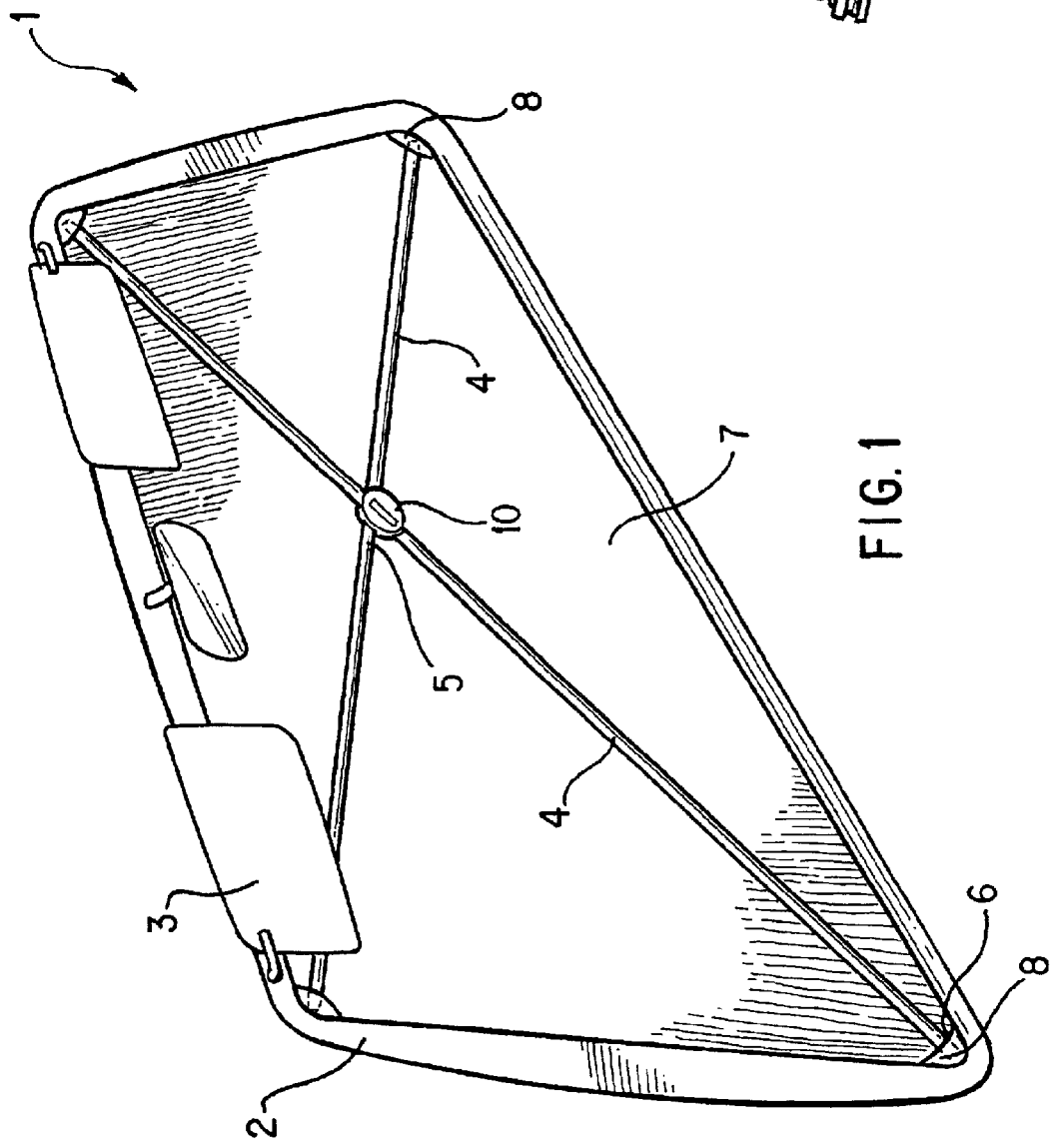
FIG. 1 is a perspective view of a sunshade for a vehicle according to a first embodiment of the present invention adapted to fit across a complete windscreen.

FIG. 1 illustrates a collapsible sunshade 1 located between a vehicle windscreen 2 and two sun visors 3. The sunshade 1 includes a plurality of supports 4, each having an outer end 6 and an inner end 5. Each support 4 can be a rod made of a relatively stiff material, such as sprung steel, fiberglass, or plastic. Each outer end 6 is connected to a collapsible shade 7 which is adapted to abut the windscreen 2 and is held in its expanded configuration by the supports 4. The shade 7 can be a thin sheet material having a slight elasticity and good shielding properties, such as a fabric cloth of natural, synthetic or blend fiber, plastic film or sheet, metal foil, TYVEK™ spunbonded olefin, or a laminate material. The shade 7 can also be provided in a meshed material or fabric to allow some visibility therethrough. A reflective coating or film can be provided on the top surface of the shade 7 to reflect sunlight and repel heat radiation.

The inner ends 5 of the supports 4 are connected at a connector 10, which is attached to the shade 7. The details of the connector 10 will be described in greater detail below in connection with FIGS. 5a, 5b, 5c, 6 and 7. In this embodiment, the shade 7 also functions to resiliently bias the connector 10 in either direction away from an unstable equilibrium configuration of the supports 4 relative to each other when the connector 10 is in a position approximately co-planar with at least two of the outer ends 6, as described in greater detail hereinbelow.

In the embodiment shown in FIG. 1, four rods 4 are provided to support a generally rectangular shade 7. Each outer end 6 of each rod 4 is attached to the shade 7 by the formation of a small generally triangular pocket 8 at each corner of the shade 7. An attachment mechanism is provided inside each pocket 8 to prevent the outer end 6 from being inadvertently removed from the pocket 8 when the sunshade 1 is in its collapsed condition. Such attachment mechanisms can include a thread (not shown) attached to the shade 7 and passed through a bore (not shown) provided in the support 4 adjacent its outer end 6.

Figure 6:
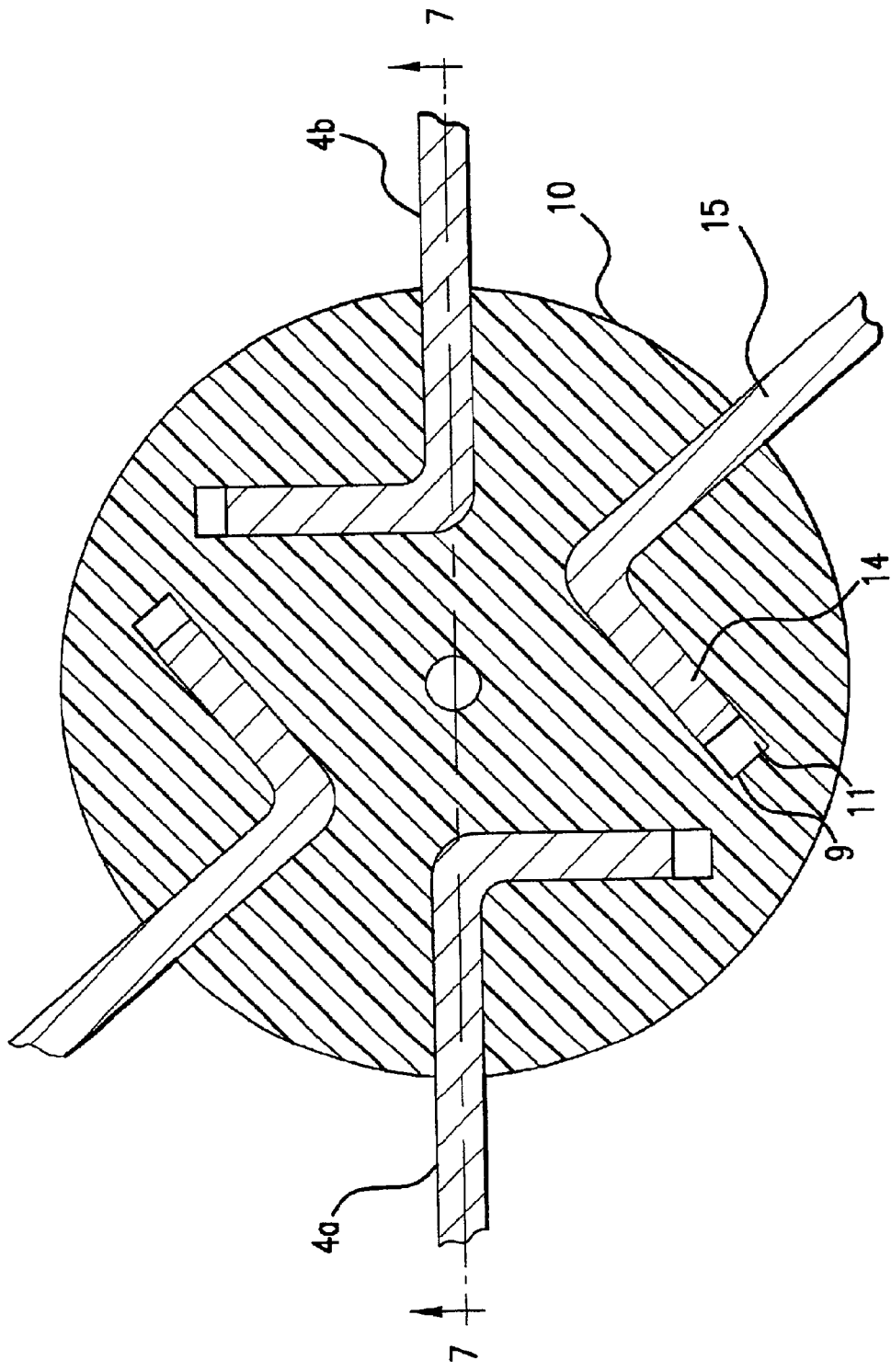
FIG. 6 is a cross-sectional view of the connector of FIG. 1.
Figure 7:
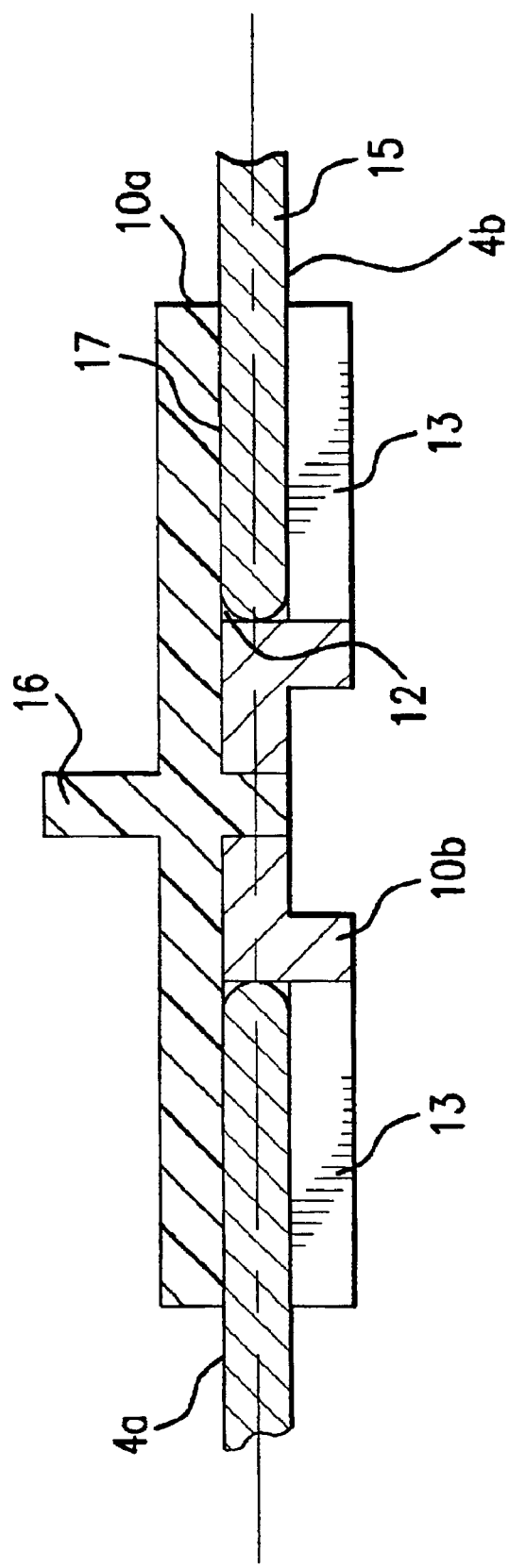
FIG. 7 is a cross-sectional view of the connector of FIG. 6 taken along line A—A.

Referring now to FIGS. 6 and 7, the inner end 5 of each support 4 is located in the connector 10. The connector 10 may be made of a relatively hard material, such as plastic. The connector 10 can be made from two separate housing pieces 10a and 10b that are connected together. Connector 10 includes a cavity 12 and groove 13, with each inner end 5 positioned within a groove 13. Each cavity 12 and groove 13 is formed by gaps provided in and between the two housing pieces 10a and 10b. A foot 14 and a segment 15 of each inner end 5 are received within cavity 12 and groove 13 of the connector 10, respectively only the end portion of each cavity 12 can be seen in FIG. 6, and is illustrated by the empty space designated by the numeral 11.

The foot 14 is angled with respect to the main segment 15 of support 4, and in the present embodiment is generally right-angled (i.e., about ninety degrees). The foot 14 is contained within the correspondingly shaped cavity 12 in connector 10 and is retained as a result of the limited movement permitted of the segment 15 in the plane of the connector 10 against the wall of the groove 13. Cavity 12 therefore forms a hinged connection between connector 10 and support 4.

Figure 5A:
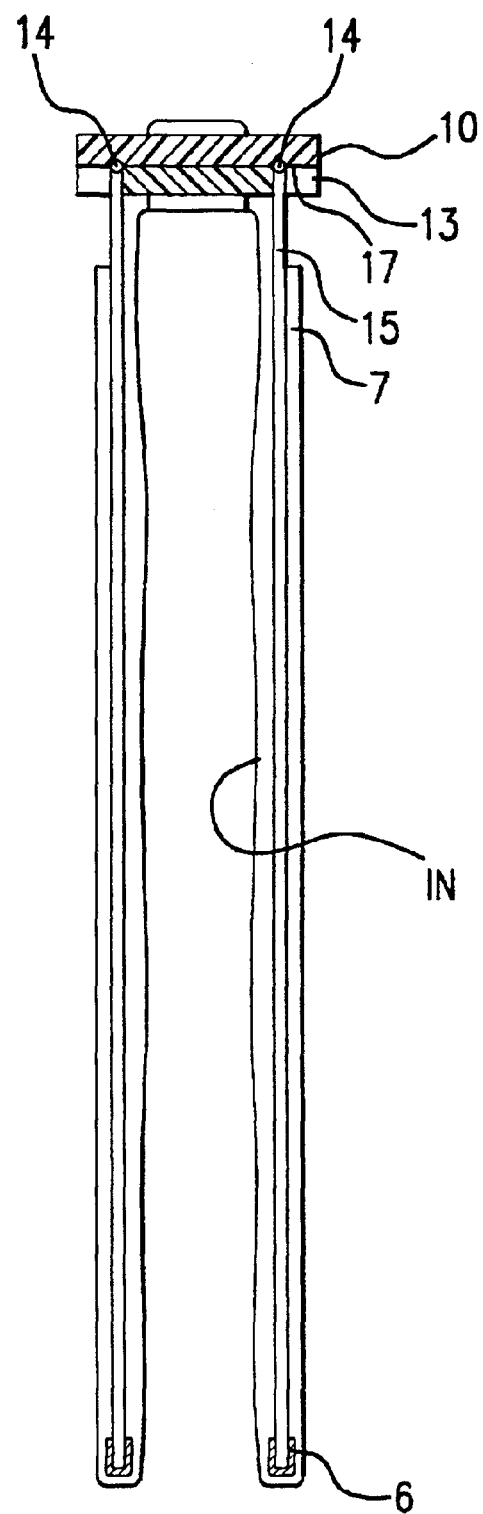

As best illustrated in FIG. 7, in use, each foot 14 of each inner end 5 is retained in a cavity 12 of the connector 10. In FIG. 7, the foot 14 of the left support 4a protrudes out of the page towards the reader, whereas the foot 14 of the right support 4b extends into the page. When the shade is moved from the expanded state shown in FIG. 5b to the collapsed state shown in FIG. 5a, each support 4 rotates out of the groove 13 by being moved by a user holding the connector 10 (or knob 16) with one hand and one of the supports 4 with the other, thereby rotating foot 14 within cavity 12. The supports 4 move away from the plane of the connector 10 (as shown in FIG. 5b) towards each other to a perpendicular position with respect to the plane of the connector 10, to collapse the shade (as shown in FIG. 5a). In the collapsed state, segments 15 of each support 4 protrude out of the page towards the reader, with reference to FIG. 6, and the outer ends 6 of the supports 4 have moved towards each other.

Similarly, as the shade is moved from its collapsed state to the expanded state, the support 4 rotates towards groove 13, thereby rotating foot 14 within cavity 12 in the opposite direction, until segment 15 meets inner surface 17 of the connector 10. Further rotation of the support in this direction is limited by abutment of segment 15 of the support 4 against the inner surface 17 of housing piece 10a. As illustrated in FIG. 7, segment 15 is positioned within groove 13 formed by housing piece lob. Housing piece 10a forms inner surface 17 that acts as a stop against which segment 15 abuts when the shade is expanded as illustrated in FIG. 5b. A knob 16 extends from the top of connector 10, and can be used by a user to grip the connector 10 to collapse the sunshade 1 from its expanded position.

FIGS. 5a, 5b and 5c illustrate the connector 10 at the different positions assumed by the sunshade 1. The shade 7 is fixedly connected to the outer ends 6 at a position such that the shade 7 is not fully stretched in the position shown in FIGS. 5b or 5c, but is substantially stretched when the sunshade 1 is in the unstable equilibrium configuration, which is a position where the supports 4 are parallel and generally co-planar to each other (i.e., between the positions shown in FIGS. 5b and 5c). In FIG. 5a, the sunshade 1 is in its fully collapsed position and the supports 4 are shown with their outer ends 6 relatively close together. In this embodiment, the bottom of surface 17 of portion 13 acts as a stop to limit movement of outer ends 6 away from each other, as shown in FIG. 5b. In FIG. 5b, the shade 7 is resiliently biasing the outer ends 6 towards each other and the bottom surfaces 17 on the two portions 13 shown represent the stop. In FIG. 5c, the sunshade 1 is shown at an intermediate position shortly before a "first" position at which the shade 7 (as a resilient biasing element) starts to resist further movement of the connector 10 from the right to the left as shown by the arrow B.

Thus, the sunshade 1 may be deployed by gripping the connector 10 (such as at the grip 16), and then moving the connector 10 through a first position (shown in FIG. 5c) at which the shade 7 begins to resist continued movement in the same direction of the connector 10, then through a second position of unstable equilibrium of the shade 7 and supports 4 relative to each other (between FIGS. 5b and 5c), and then to a third stable or deployed position (shown in FIG. 5b) resulting in cooperation between the stop (i.e., bottom of surface 17) and the shade 7. In the third position, the sunshade 1 is in an expanded position supported by the supports 4, with the outer ends 6 closer to the windscreen than the connector 10. The sunshade 1 can be collapsed by reversing the above steps; in particular, by applying force to cause the shade to pass through the unstable equilibrium position and subsequently, the first position, until the sunshade 1 is collapsed to the configuration shown in FIG. 5a.

Figure 4:
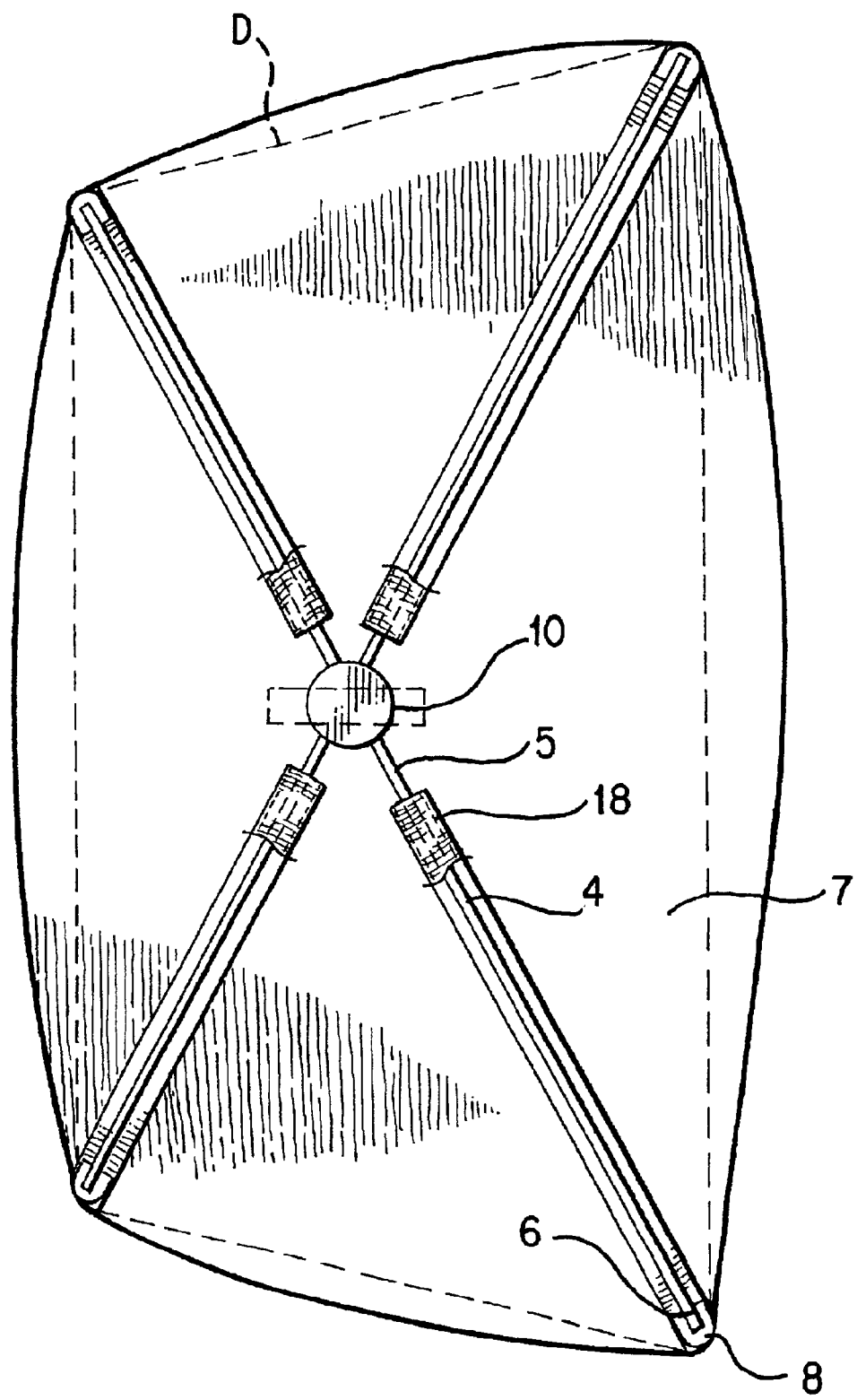
FIG. 4 is a plan view of a sunshade according to a second embodiment of the present invention.

FIG. 4 illustrates a second embodiment of a sunshade according to the present invention that is similar to the embodiment of FIG. 1, in which the shade 7 is in its expanded condition. The supports 4 are positioned within longitudinal pockets 18 that are affixed to the shade 7. The connector 10 is illustrated generically by a circle, but has the same structure as connector 10 described above in connection with FIGS. 5a, 5b, 5c, 6 and 7. The dashed lines between the outer ends 6 indicates the lines of tension in the shade 7 created by the outer ends 6 and the resilient biasing of the shade 7 that urge the connector 10 into the page towards the shade 7. The portions of the shade 7 outside the dashed lines are thus less firmly held or tensioned.

Figure 8A:
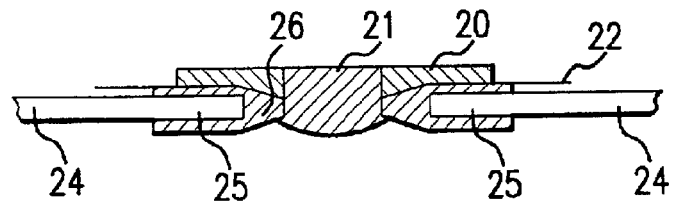
FIGS. 8*a* and 8*b* are cross-sectional and plan views, respectively, of a connector according to a third embodiment of the present invention.
Figure 8B:
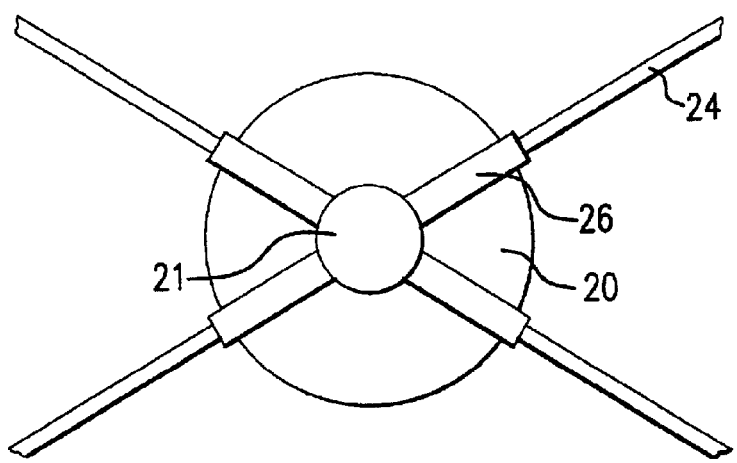

FIGS. 8a and 8b illustrate an alternative construction for the connector 10, identified by the numeral 20. In this embodiment, resilient sleeves 26 (such as synthetic or natural rubber or a spring) includes a resilient material located between inner ends 25 of the supports 24. A central portion 21 of connector 20 is located between the resilient sleeves 26. Each sleeve 26 also forms a hinge, and the surface 22 provides a stop to limit rotation of the supports 24.

Figure 9A:
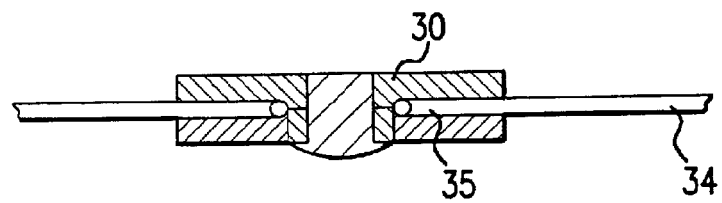
FIGS. 9a and 9b are cross-sectional and plan views, respectively, of a connector according to a fourth embodiment of the present invention.
Figure 9B:
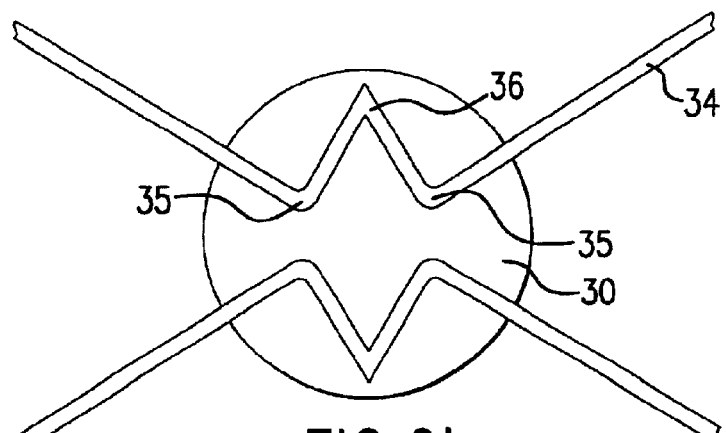

FIGS. 9a and 9b illustrate yet another alternative construction for the connector 10, identified by the numeral 30. In the connector 30, the inner ends 35 of the supports 34 are connected by a resilient strip of material 36, which can take the form of a V-shaped strip of sprung steel. The resilient strip of material 36 operates to resiliently bias the connector 30 so that the inner ends 35 of the supports 34 are urged apart in the second position (i.e., unstable equilibrium position). Thus, it is possible to manufacture two adjacent supports 34 as a single piece, connected at their inner ends 35. The connector 30 has a planar surface which acts as a stop surface.

Figure 10A:
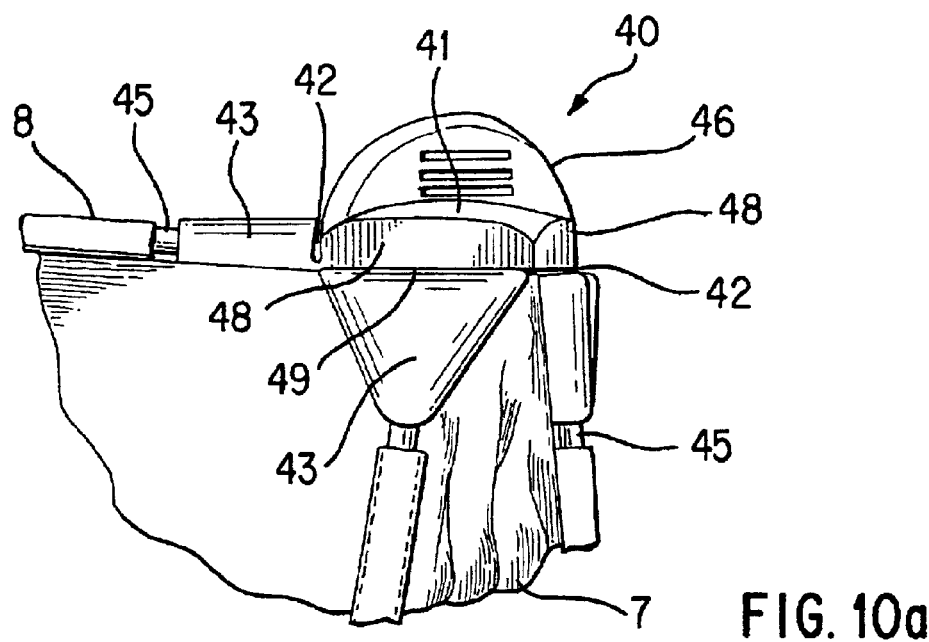
FIGS. 10a and 10b are side and plan views, respectively, of a connector according to a fifth embodiment of the present invention.
Figure 10B:
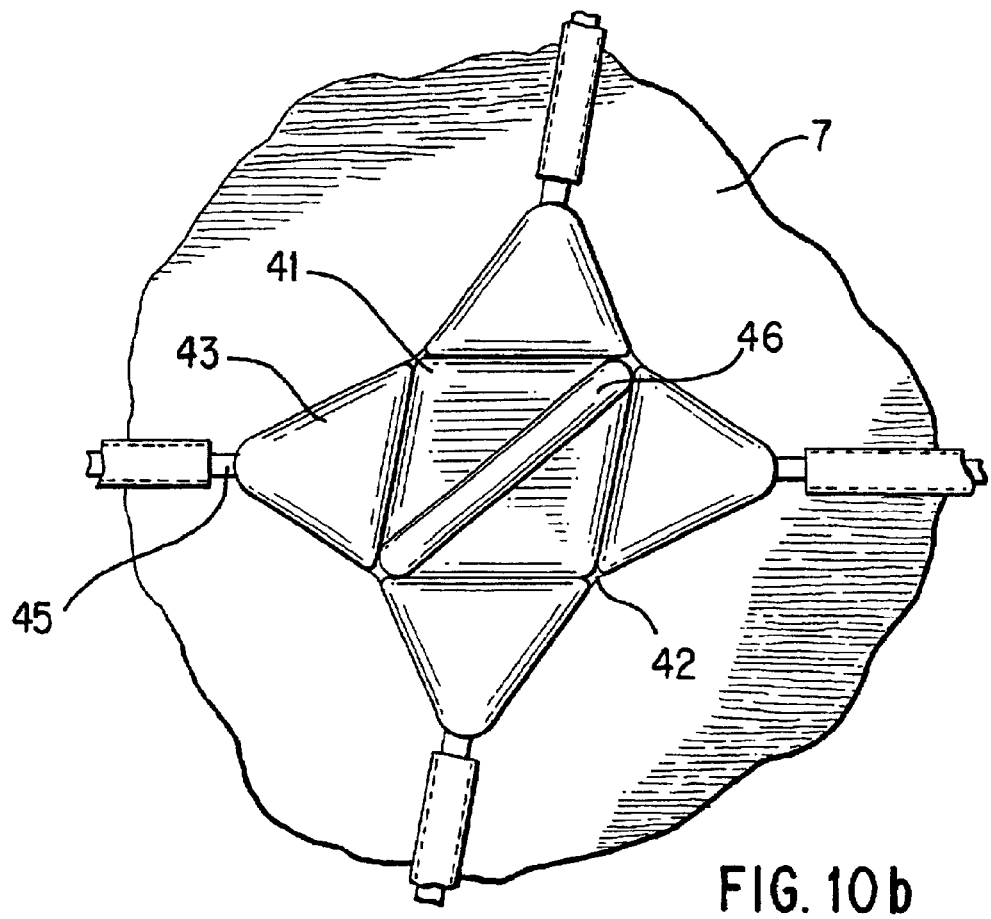
Figure 10C:
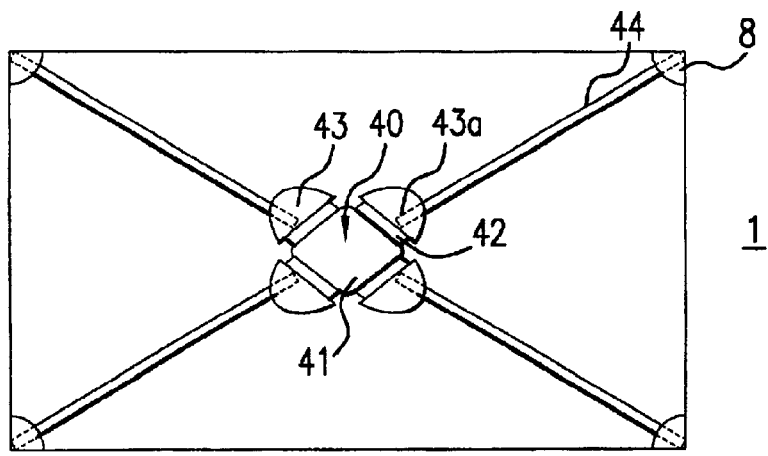
FIG. 10c is a perspective view of a sunshade utilizing the connector of FIGS. 10a and 10b.

FIGS. 10a, 10b, 10c and 11 illustrate yet a further alternative construction for the connector 10, identified as 40. The connector 40 is illustrated in FIG. 10a with the left side of the connector 40 shown in the expanded position of the sunshade, and with the right side of the connector 40 shown in the collapsed position of the sunshade. This position is for illustration only and would not be used in normal use. The connector 40 has a quadrilateral central portion 41 with four generally triangular hinged leaves 43, each of which has one side which is hingedly connected to the central portion 41 by a respective integral relatively thin section 42. Each thin section 42 forms a separate hinge for the connector 40. Thus, the central portion 41 forms one leaf of each hinge and the other leaf of the hinge is formed by an external leaf 43. Each external leaf 43 further includes a bore 43a, shown in phantom in FIG. 10c, that is perpendicular to the hinge 42. The bore 43a receives an inner end 45 of a support 44. The supports 44 are held within each bore 43a by the tension in the shade 7 which is attached to both the outer ends of the supports 44 and to the central portion 41 (on the other side of connector 40 from the collapsing knob 46). The shade 7 is provided in a material that provides some elasticity, so that the shade 7 can operate to resiliently bias the connector 40 in either direction away from the unstable equilibrium position. The opposing end faces or edges 48 of the central portion 41, on the one hand, and face or edge 49 of each external leaf 43, on the other hand, abut to form a stop. Thus, each leaf 43 is able to rotate relative to the central portion 41 about the hinge 42 in one direction (i.e., away from the knob 46 or in the downward direction in FIG. 10a), but the abutment of the opposed parallel faces 48 and 49 prevents rotation in the opposite direction (i.e., in the upward direction in FIG. 10a) during normal use. The connector 40 can be made of a relatively hard material such as a plastic or metal.

Figure 11:
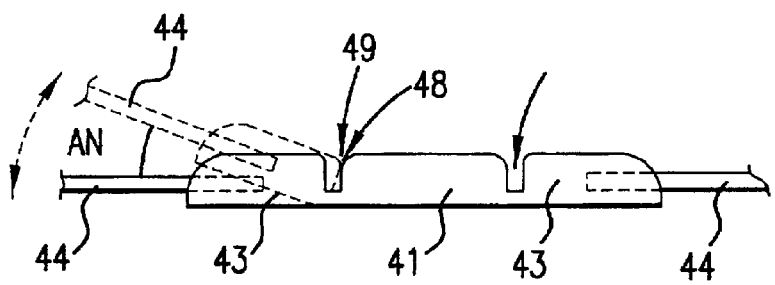
FIG. 11 is a cross-sectional view of the connector of FIGS. 10a and 10b.

The operation of the connector 40 is better illustrated in connection with FIG. 11. Two opposing leaves 43 are illustrated in the context of the central portion 41. The leaf 43 on the left side of FIG. 11 is shown in two different positions: the leaf 43 is shown in solid lines in a horizontal position (i.e., the unstable equilibrium position of the sunshade 1), and in dashed lines in the third stable or deployed position with the opposing faces 48 and 49 in abutment with each other. When in the third stable or deployed position, the leaf 43 is displaced from the horizontal position by an angle AN of approximately three to ten degrees. Thus, as illustrated in FIG. 11, when the leaf 43 passes the unstable equilibrium position, it is retained in the third stable or deployed position until a force (in the downward direction in FIG. 11) is applied to cause the leaf 43 to pass the unstable equilibrium position again. The resilience of the shade 7 assists in retaining the leaf 43 and the shade 7 in the third stable or deployed position.

Figure 12A:
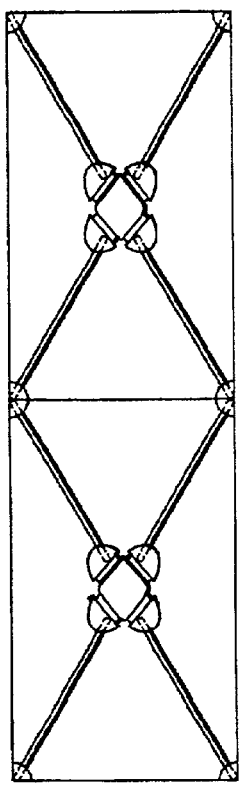
FIGS. 12A–12C illustrate how a combination of the sunshade of FIGS. 10 and 11 can be configured to cover larger areas.
Figure 12B:
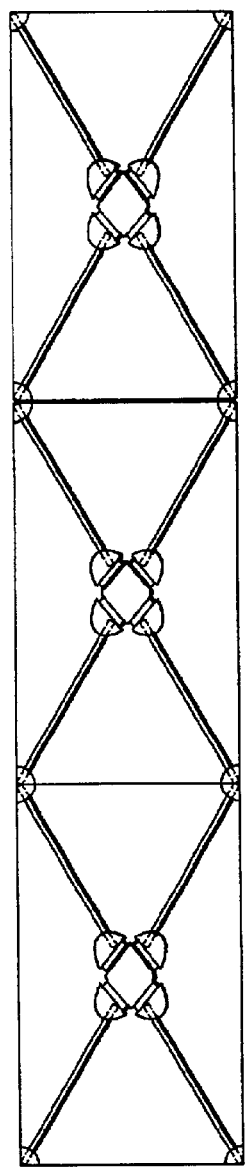
Figure 12C:
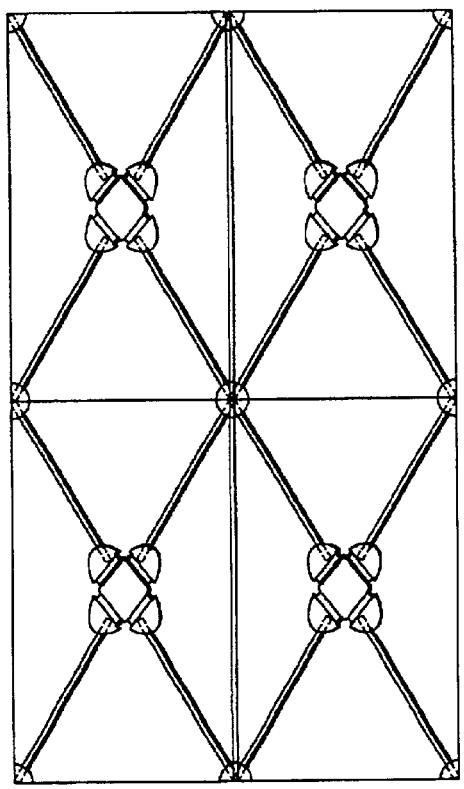

In use, the sunshades 1 of the present invention are adapted to be positioned between a sun visor 3 and the windscreen 2 of a vehicle along the upper edge of the sunshade 1, and to be positioned along the dashboard at the lower edge of the sunshade 1. While FIG. 1 illustrates the sunshade 1 as covering the entire windscreen 2, it is also possible to provide a plurality of sunshades 1 to cover a windscreen 2, window or other area. For example, FIG. 12A illustrates the deployment of two sunshades 1 in a side-by-side manner to cover a windscreen 2. FIG. 12B illustrates the deployment of three sunshades 1 in a side-by-side manner. FIG. 12C illustrates the deployment of four sunshades 1 (two rows of two sunshades 1, one row above the other row) that are configured to cover a larger area.

Figure 13C:
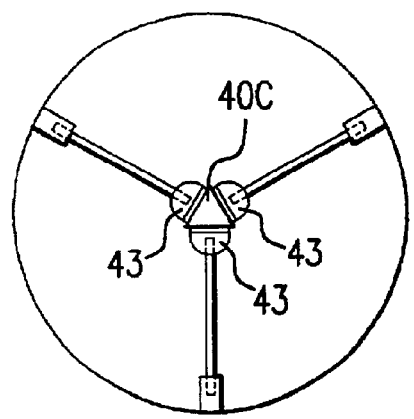
FIGS. 13A–13C illustrate sunshades similar to the sunshade of FIGS. 10 and 11, but having different shapes and number of leaves in their connectors.
Figure 13B:
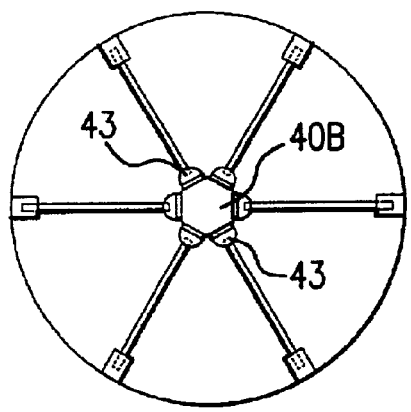
Figure 13A:
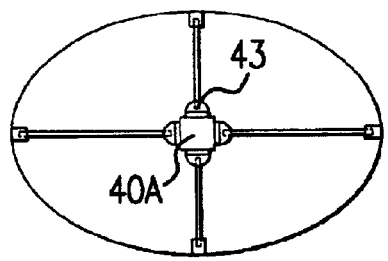

In addition, the shape of the sunshade 1 does not necessarily need to be rectangular. As illustrated in FIGS. 13A–C, the sunshade 1 can assume an oval or circular shape. Other shapes, such as trapezoidal, triangular, pentagonal, hexagonal, and irregular, can also be provided.

Moreover, although the connector 40 in FIGS. 10 and 11 is illustrated as having four leaves 43, it is also possible to provide the connector 40 with any number of leaves 43, with each leaf 43 adapted to connect a separate support 44. For example, FIGS. 13B and 13C illustrate connectors 40 having six and three leaves 43, respectively. In these cases, the configuration of the connector must be adapted to provide the opposing stop surfaces between each leaf and the connector. For example, the connector 40a in FIG. 13A has a generally rectangular configuration with four sides, each side adapted to oppose a stop surface from one of the four leaves. Similarly, the connector 40b in FIG. 13B has a generally hexagonal configuration with six sides, each side adapted to oppose a stop surface from one of the six leaves. Moreover, the connector 40c in FIG. 13C has a generally triangular configuration with three sides, each side adapted to oppose a stop surface from one of the three leaves.

Figure 14:
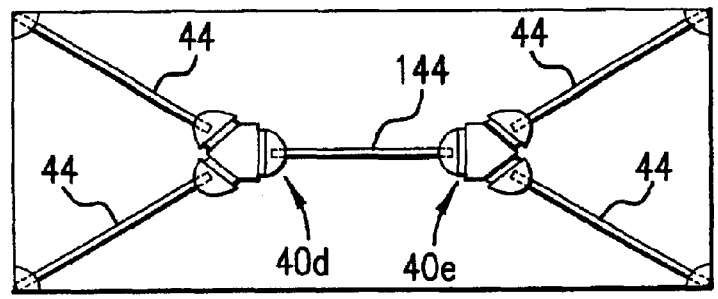
FIG. 14 illustrates a sunshade similar to the sunshade of FIGS. 10 and 11, but having a plurality of connectors.

FIG. 14 illustrates that more than one connector 40 can be provided to support the sunshade 1. For example, FIG. 14 illustrates a sunshade having two connectors 40d and 40e, each having three leaves 43. Two of the leaves 43 of each connector 40d, 40e are connected to a separate support 44 that has its outer end attached to a corner of the shade 7. A central support 144 has opposing ends connecting the remaining leaf 43 of each connector 40d, 40e. Each connector 40d and 40e can assume a configuration that provides three sides, each side adapted to oppose a stop surface from one of the three leaves. One advantage with the provision of a plurality of connectors 40 is that the support for the shade 7 is improved while minimizing the number of supports 44 that are used.

Figure 15A:
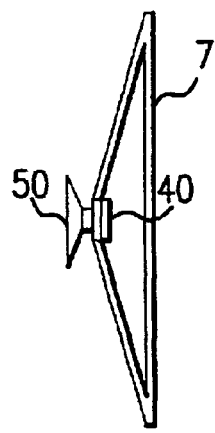
FIGS. 15A and 15B illustrate the use of suction cups with the sunshade of FIGS. 10 and 11.
Figure 15B:
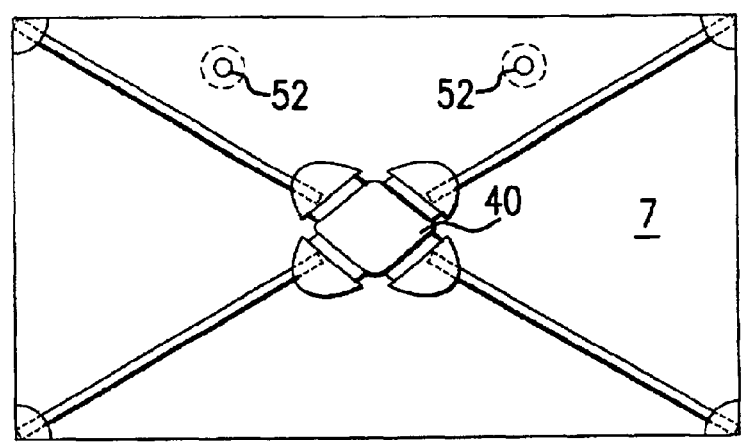

It is also possible to affix the sunshade 1 to a window, such as a side window of a vehicle, by using suction cups, VELCRO™ tags for attachment to grab handles, VELCRO™ strips, and the like. As shown in FIG. 15A, a suction cup 50 can be connected to the connector 40 (on the side of the knob 46) to affix the sunshade 1 to the window. Affixation through the use of the suction cup 50 brings the sunshade 1 closer to the window to allow the sunshade 1 to be more effective in shading the interior of a vehicle. FIG. 15B illustrates the attachment of suction cups 52 to the shade material 7 in spaced-apart manner. Any number of suction cups 50, 52 can be provided, and at any location on the connector 40 and/or the shade 7.

Figure 16A:
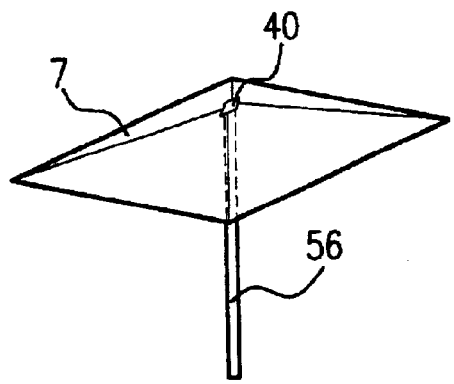
FIGS. 16A–16C illustrate how the sunshade of FIGS. 10 and 11 can be converted into an umbrella.
Figure 16B:
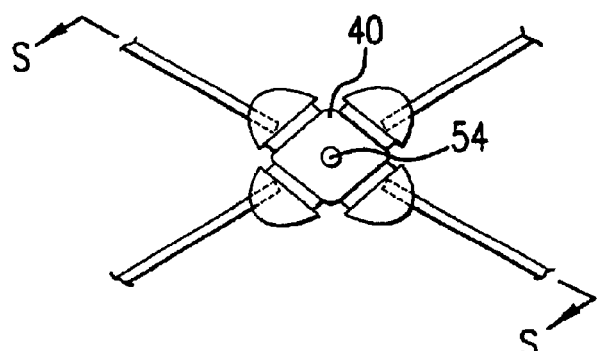
Figure 16C:
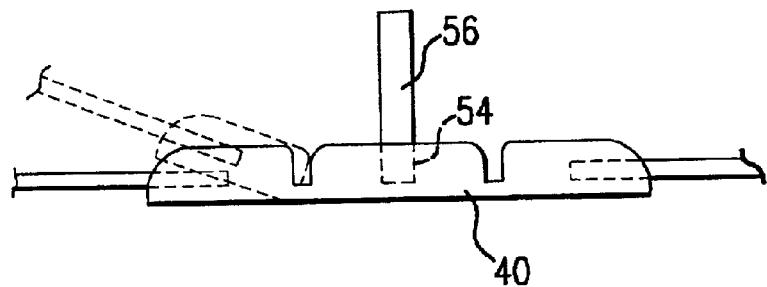

FIGS. 16A–16C illustrate an alternative use for the sunshade 1 of the present invention, in which the sunshade 1 can be converted into an umbrella. This can be accomplished by providing the connector 40 without the knob 46, and instead of the knob 46, providing a hole 54 on the same side of the connector 40 where the knob 46 was originally positioned. To convert the sunshade 1 into an umbrella, an end of a pole or shaft 56 can be inserted into the hole 54 and secured therein, as shown in FIGS. 16A and 16C. Alternatively, a pair of fabric straps may be provided, in for example, a sunshade with a quadrilateral connector, each attached to and joining adjacent supports 4 so as to act as a handle. The user's fingers pass through these fabric loops and allow the user to hold the sunshade 1 in such a way that it prevents the sunshade 1 from opening. The sunshade 1 can then be used as an umbrella by deploying it in the third stable position.

Figure 17:
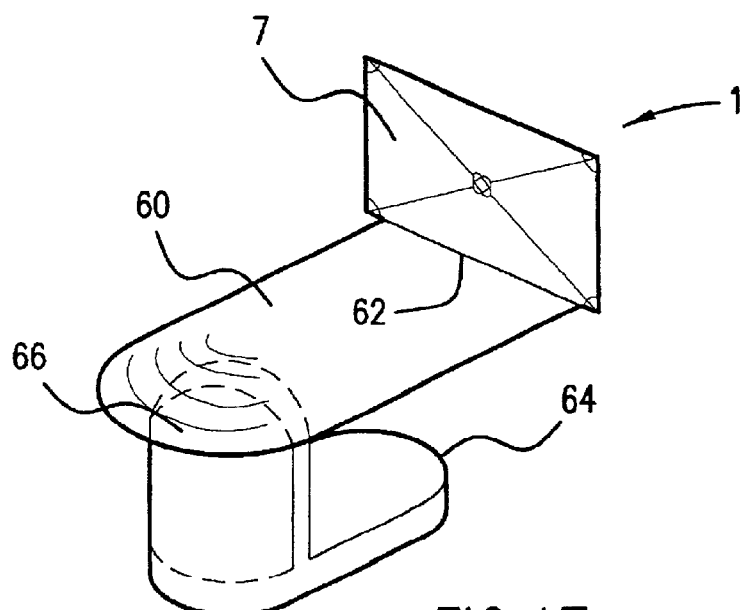
FIG. 17 illustrates another modification that can be made to the sunshade of FIGS. 10 and 11.

FIG. 17 illustrates another modification that can be made to the sunshade 1. In FIG. 17, the sunshade 1 is illustrated as being deployed against a windscreen (not shown). A side panel 60 is attached to one side or edge 62 of the sunshade 1 by way of sewing or VELCRO™ tape. The side panel 60 may be made from the same material, or a different material as the shade 7. The side panel 60 is adapted to cover an upper portion of a vehicle seat 64 when the sunshade 1 is itself deployed against the windscreen. This is accomplished by resting an outer end 66 of the side panel 60 on top of a headrest (shown in phantom in FIG. 17) of the seat 64. Outer end 66 of the side panel 60 my also be provided with elastic binding or a pocket (to accomodate the headrest) to assist in securing the outer end 66 to the top of a headrest. When used in the manner, the side panel 60 can be effective in protecting the seat 64 from heat and sunlight (especially if the seat 64 is upholstered in leather), and in shielding objects placed on the seat 64 from external view of passer-bys.

The sunshade 1 of the present invention can be used in applications other than merely shading the interior of an automobile. For example, it can be converted for use as an umbrella, as described in connection with FIGS. 16A–16C. As another example, the sunshade 1 can be used as a photographic reflector by providing a reflective film or cover on the inside (i.e., the bottom side of the shade 7 as designated by "IN" in FIG. 5a) of the shade 7.

FIGS. 18A–18D illustrate a modification that can be made to the connector 40 of FIGS. 10–11. The connector 40a in FIGS. 18A–18D is essentially the same as the connector 40 of FIGS. 10–11 except for the differences noted hereinbelow. Therefore, the same numeral designations are used in FIGS. 10–11 and 18A–18D where possible except that an "a" has been added to the designations in FIGS. 18A–18D.

FIGS. 18A and 18B are side views of a portion of the central portion 41a and one leaf 143 of the connector 40a, while FIGS. 18C and 18D are the top plan views corresponding to the views of FIGS. 18A and 18B, respectively. The central portion 41a and leaf 143 of the connector 40a are the same as the central portion 41 and leaf 43 of the connector 40 (compare with FIG. 11), except that a fixing or locking member 101 is provided along the inner edge 49a of the leaf 143, and a corresponding groove 102 is provided in the top surface 99 and opposing edge 48a of the central portion 41a facing the inner edge 49a of the leaf 143. The locking member 101 can take the form of a protrusion or tongue having an enlarged rounded end 100. The groove 102 can have the same configuration and size as the locking member 101 to accomodate the locking member 101.

In operation, the connector 40a and its supports 44a operate in the same manner as the connector 40 and its supports 44. However, the locking member 101 and groove 102 allow the leaves 143 to be held in the third stable or deployed position (or even in the unstable equilibrium position) without relying on the resilience of the shade 7. In this regard, FIGS. 18B and 18D illustrate the connector 40a when the sunshade 1 is in its fully collapsed position (such as in FIG. 5a). When the sunshade 1 is deployed, the leaves 143 are hinged upwardly about the thin sections 42a and each locking member 101 is fitted inside its corresponding groove 102, as shown in FIGS. 18A and 18C. The enlarged end 100 of the locking member 101 retains the locking member 101 inside the groove 102. To fold and collapse the sunshade 1, the user merely pushes the supports 44a downwardly to cause the locking member 101 to be disengaged from the groove 102.

Figure 19:
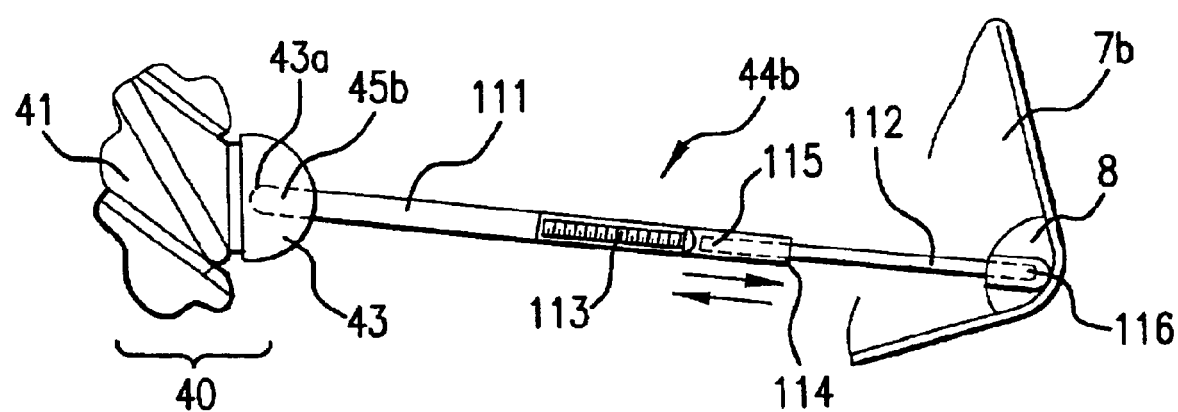
FIG. 19 illustrates a modification that can be made to the supports of the sunshade of FIG. 10c.

FIG. 19 illustrates a modification that can be made to the supports 44 of FIGS. 10–11. The support 44b in FIG. 19 is essentially the same as the support 44 of FIGS. 10–11 except for the differences noted hereinbelow. Therefore, the same numeral designations are used in FIGS. 10–11 and 19 for the support 44 where possible except that a "b" has been added to the designations in FIG. 19.

The support 44b in FIG. 19 provides varying length so as to allow the sunshade 1 of the present invention to be adjusted to different dimensions to fit different windshield sizes. The support 44b has a tube portion 111 having an inner end 45b that is secured inside the bore 43a of the leaf 43. The tube portion 111 can be made of a plastic or a metal (e.g., aluminum) material. Part of the tube portion 111 has a hollow interior which houses a resilient element 113 (such as a spring). The outer end 114 of the tubular portion 111 is open, so that the resilient element 113 can be introduced through the open outer end 114. In addition, an inner end 115 of a bar 112 (such as a metal bar) is also inserted through the open outer end 114 and extends in the hollow interior of the tube portion 111 to contact or engage the resilient element 113. The inner end 115 can be enlarged to ensure that it is securely retained (e.g., by friction fit) inside the tubular portion 111. The outer end 116 of the bar 112 is secured inside a pocket 8 at each corner of the shade 7. After the resilient element 113 and the inner end 115 of the bar 112 have been inserted through the outer end 114, the outer end 114 can be indented to prevent the resilient element 113 and the inner end 115 of the bar 112 from slipping outside the tubular portion 111.

In use, the resilient element 113 naturally biases the bar 112 radially outwardly so that the overall length of the support 44b can be adjusted. In particular, the resilient element 113 has a maximum length which is attained when the resilient element 113 is allowed to extend freely without the application of any counterbiasing force. Therefore, the resilient element 113 would naturally bias the bar 112 as far outwardly in the radial direction unless this bias is restricted. By adjusting the length of the supports 44b, the overall size (i.e., width and height) of the sunshade 1 can be adjusted.

Figure 20:
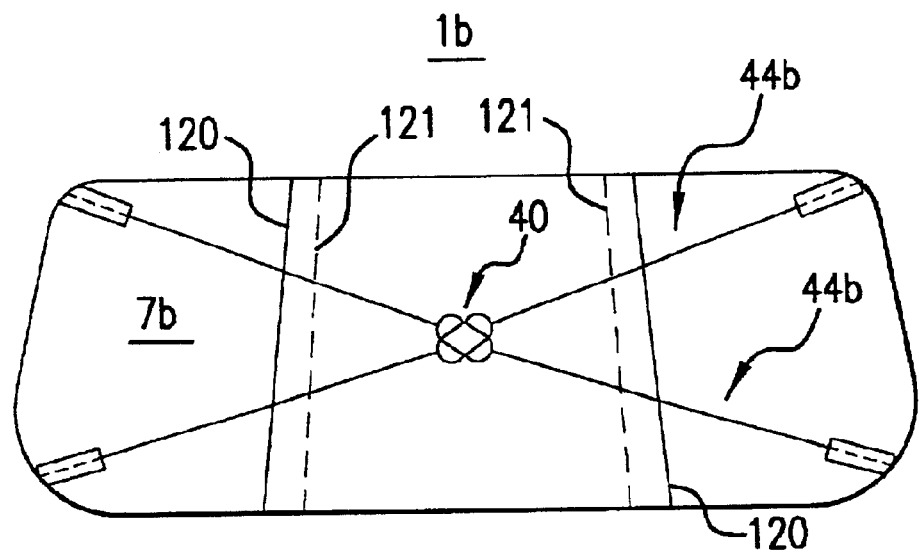
FIGS. 20 is a perspective view of a sunshade utilizing the support of FIG. 19.

FIG. 20 illustrates a sunshade 1b that utilizes the connector 40 of FIGS. 10–11 and the support 44b of FIG. 19. To deploy the sunshade 1b, the sunshade 1b is positioned within the confines of the automobile windshield. The resilient element 113 will naturally bias the bar 112 radially outwardly until the outer end 116 of the bar 112 abuts a corner of the frame of the windshield. This abutment will prevent the further radial bias of the resilient element 113, but also functions to provide a snug fit of the sunshade 1b within the confines of the frame of the windshield. The material of the shade 7b will be folded or wrinkled as the bar 112 is radially extended to provide the necessary cover for the windshield. In one embodiment, two optional fold lines 120 and 121 (in phantom) can be provided on either side of the connector 40 so that the shade 7b can be folded in along these two fold lines 120 and 121 so as to shorten the span or width of the shade 7b.

Figure 21:
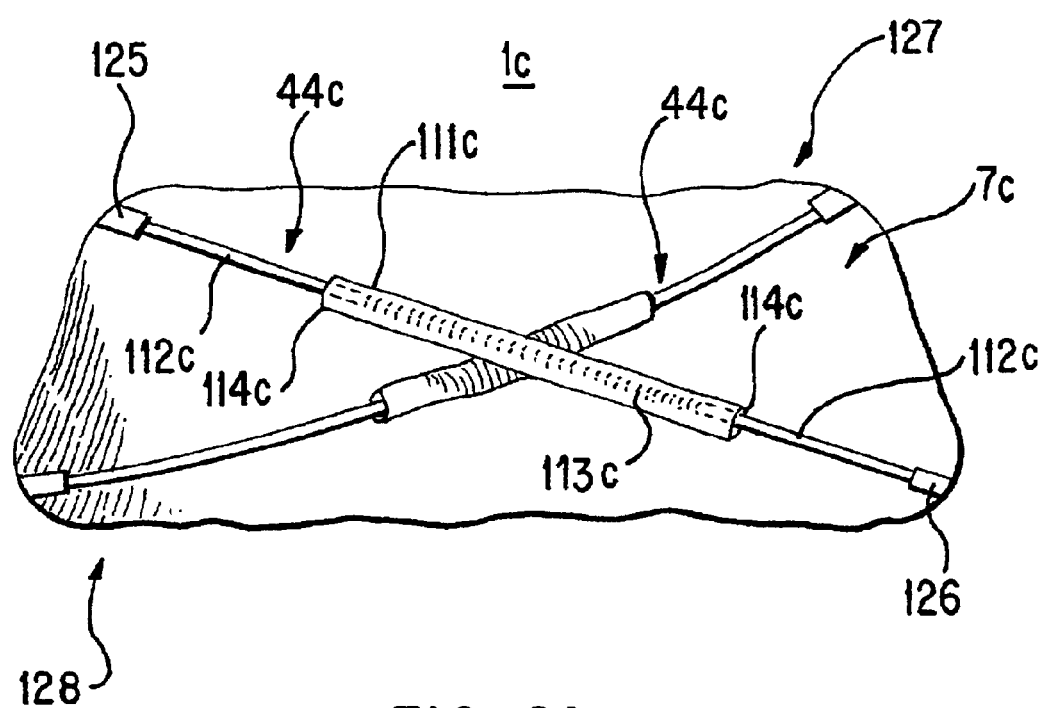
FIGS. 21 is a perspective view of a sunshade utilizing a different support.

FIG. 21 illustrates another way of utilizing adjustable supports with a shade 7 to create a sunshade. The support 44c in FIG. 21 is essentially the same as the support 44b of FIG. 19 except for the differences noted hereinbelow. Therefore, the same numeral designations are used in FIGS. 19 and 21 for the supports 44b and 44c where possible except that a "c" has been added to the designations in FIG. 21. The sunshade 1c of FIG. 21 does not have any connector 40, but instead has two adjustable supports 44c. Each support 44c extends from one corner (e.g., 125) of the shade 7c to an opposing diagonal corner (e.g., 126) of the shade 7c. Each support 44c has a central tubular portion 111c with two opposing open ends 114c. A resilient element 113c is received inside the hollow interior of the tubular portion 111c, and one bar 112c extends from inside each open end 114c radially outwardly towards a corner 125 or 126. The two supports 44c cross or intersect each other at about the center of the sunshade 1c, and do not need to be attached or coupled to each other.

The width and height of the sunshade 1c can be adjusted by varying the length of some or all of the four bars 112c. For example, the bars 112c for each support 44c on one side 127 of the sunshade 1c can be adjusted without adjusting the bars 112c for each support 44c on the other side 128. As another example, all four bars 112c can be adjusted.

Finally, those skilled in the art will appreciate that any of the principles illustrated herein can be combined. As a non-limiting example, the connector 40a of FIGS. 18A–18D can be used together with the supports 44b or 44c of FIGS. 19 or 21.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A sunshade, comprising:
   a shade;
   at least two supports, each support having a first end and a second end, with the second end of each support coupled to the shade at spaced-apart locations thereof; and
   a connector coupled to the first end of at least two of the supports, the connector having a central portion that has a groove, and one leaf for coupling the first end of each support, with the leaf hingedly connected to the central portion by an integral thin section and having a locking member fitted inside the groove to hold the leaf at a fixed position with respect to the central portion.

2. The sunshade of claim 1, wherein the shade is adapted to assume an unstable equilibrium position in which the supports and the shade are substantially coplanar with the connector, a collapsed position when the shade and supports are on one side of the unstable equilibrium position in which the shade is folded, and a deployed position when the shade and supports are on the other side of the unstable equilibrium position in which the supports and the shade are expanded.

3. The sunshade of claim 1, further including a stop, and wherein the connector engages the stop when the shade is in the deployed position.

4. The sunshade of claim 1, wherein the connector acts as a hinge for the shade about the unstable equilibrium position.

5. The sunshade of claim 1, wherein the at least two supports comprises four supports, and the shade has four sides and four corners, with the second end of each support connected to a separate corner.

6. The sunshade of claim 1, wherein the central portion is provided in a configuration selected from the group consisting of quadrilateral rectangular, triangular, hexagonal, trapezoidal and pentagonal.

7. The sunshade of claim 1, wherein the central portion has one stop edge adjacent each thin section, and the leaf has one stop edge adjacent each thin section, wherein the stop edges of the corresponding leaf and the central portion engage each other when the shade is in the deployed position.

8. The sunshade of claim 1, wherein each support has a length, a first end and a second end, with the second end of each support coupled to the shade at spaced-apart locations thereof, each support having an adjustable length.

9. The sunshade of claim 8, wherein each support has a resilient element and bar coupled thereto, with the bar including the second end.

10. The sunshade of claim 8, wherein each support further includes a tubular portion having a hollow interior that houses the resilient element.

11. The sunshade of claim 8, wherein each resilient element is coupled to the first end of each support.

12. A sunshade, comprising:

a shade;

at least two supports, each support having a length, and opposing ends, each support further comprising a rigid portion and a resilient portion that does not overlap the rigid portion of the same support, with the opposing ends of each support coupled to the shade at spaced-apart locations thereof, each support having an adjustable length; and wherein the first and second supports overlap each other.

* * * * *